April 30, 1963 H. G. FISHER 3,087,563
SCREEN CLEANING DEVICE
Filed May 26, 1960 2 Sheets-Sheet 1
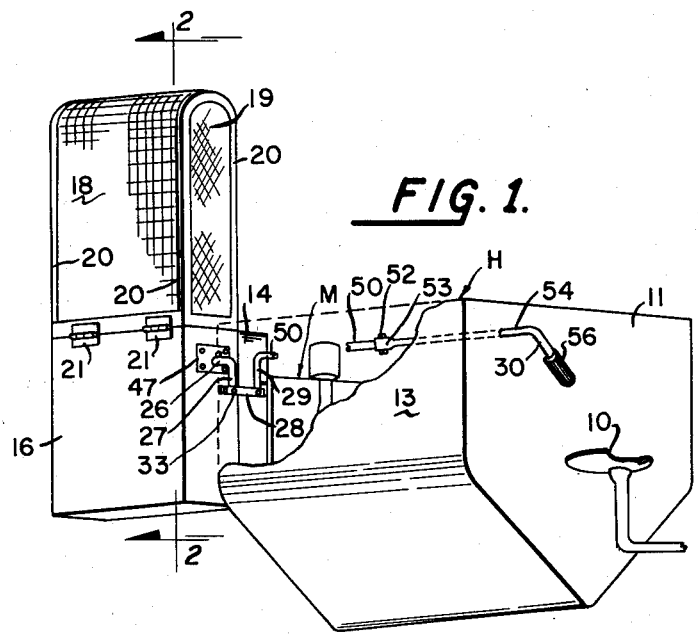
FIG. 1.
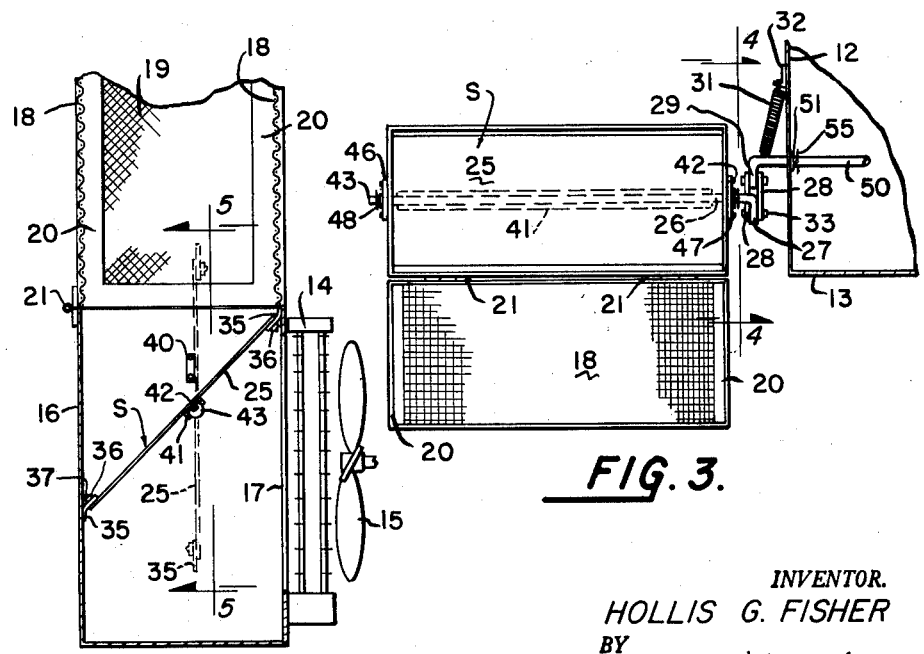
FIG. 2.
FIG. 3.
INVENTOR.
HOLLIS G. FISHER
BY
Horace B. Van Valkenburgh
ATTORNEY April 30, 1963          H. G. FISHER                3,087,563
                     SCREEN CLEANING DEVICE
Filed May 26, 1960                              2 Sheets-Sheet 2

INVENTOR.
HOLLIS G. FISHER
BY
ATTORNEY

United States Patent Office 3,087,563
Patented Apr. 30, 1963

3,087,563
SCREEN CLEANING DEVICE
Hollis G. Fisher, Wray, Colo.
Filed May 26, 1960, Ser. No. 31,921
10 Claims. (Cl. 180—68)

This invention relates to a cleaner for a screen for radiator shields, which screen filters air for motors on farm machinery, particularly combines, cotton pickers, and the like.

A serious problem which arises in the harvesting of maize, barely, oats, wheat and other grains, is that the chaff which blows from the combine accumulates on the screen for the radiator shield which encloses the radiator of the motor which drives the combine, thus preventing the passage of air to cool the radiator. The problem is acute because the fan behind the radiator pulls the air through the screen, thereby causing the chaff in the air to be pulled against the screen. When the screen becomes clogged with chaff, the air cannot pass through, causing the motor to overheat. The problem is particularly serious when the grain is cut closer to the ground, increasing the amount of chaff in the air, and in areas, as in Montana, where Canadian thistle grows, and also in bottomland where there are a considerable number of cottonwood trees, the light blooms of both the thistle and the cottonwood being in the air to be pulled against the screen of the radiator shield and being difficult to remove.

Normally, in order for the operator of the combine to clean off the screen, it is necessary for him to stop harvesting, stop the motor of the combine to stop the fan, and leave his seat to scrape the chaff from the screen with his hands or a tool. This is time consuming and often results in the more serious problem of vapor lock of the engine, making the engine difficult to start again, thus resulting in additional loss of time. This uses up valuable harvest time and sometimes the time spent in cleaning off the screen is equal to that actually spent in harvesting the grain. In order to avoid vapor lock, the operator often leaves the engine running, but then the fan is still pulling air through the screen, so that as the operator scrapes off the chaff, a large portion of it is immediately pulled back onto the screen by the fan, making it impossible to clean off all the chaff.

Various attempts have been made to solve this problem, one such device utilizing a shutter within the radiator shield, between the screen and the front of the radiator having a fan on the rear side thereof, which may be swung by remote control means by the operator while sitting in his seat on the combine to a closed position, thereby shutting off the fan from the screen, so that it cannot pull air through the screen. However, this device has the disadvantage that the chaff on the screen is not completely dislodged, but the operator must stop operation of the combine, climb down off his seat, then go back to the screen and scrape it off. This necessitates interruption of the harvesting of the grain and is not entirely satisfactory, since the chaff becomes embedded in the screen wires, making it difficult to remove all of the chaff from the screen.

Among the objects of this invention are to provide a novel cleaner for a radiator shield, particularly adapted for use on combines and similar agricultural machinery; to provide such a cleaner which is of simple construction and has a minimum number of parts; to provide such a cleaner which is easy to install, as on a combine; to provide such a cleaner which is highly efficient, and adapted to clean a radiator screen under the worst of conditions in a short time, such as five seconds; to provide such a cleaner having a shutter which swings from an open to a closed position through a small angle, such as 45°, thereby creating air hammer or high air pressure within the shield to clean the chaff from the screen; and to provide such a cleaner which cleans chaff off the screen of a radiator shield by means of an air hammer or air pressure built up within the shield.

Additional objects and the novel features of this invention will become apparent from the description which follows, taken in conjunction with the accompanying drawings, in which:

FIG. 1 is a perspective view of a portion of a combine utilizing the radiator screen cleaner of this invention, with certain parts broken away for clarity of illustrations;

FIG. 2 is an enlarged vertical section, taken along line 2—2 of FIG. 1, showing the shutter in closed position in full lines and in open or normal position in dotted lines;

FIG. 3 is an enlarged top plan view of the radiator shield and screen of FIG. 2, with the screen swung to open position and the shutter in closed position;

Figure 4:
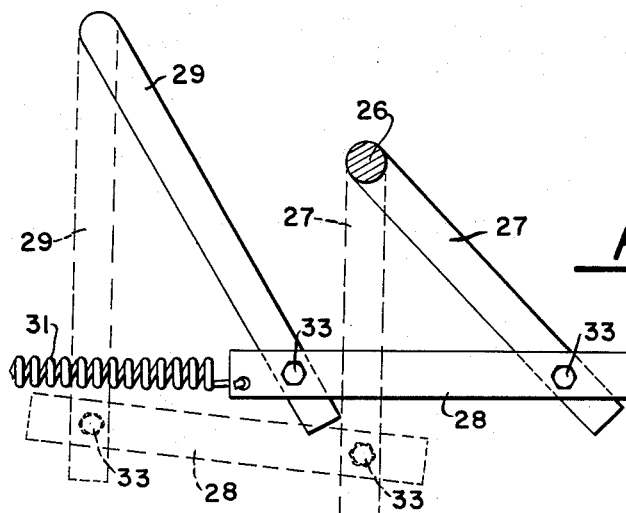
Figure 5:
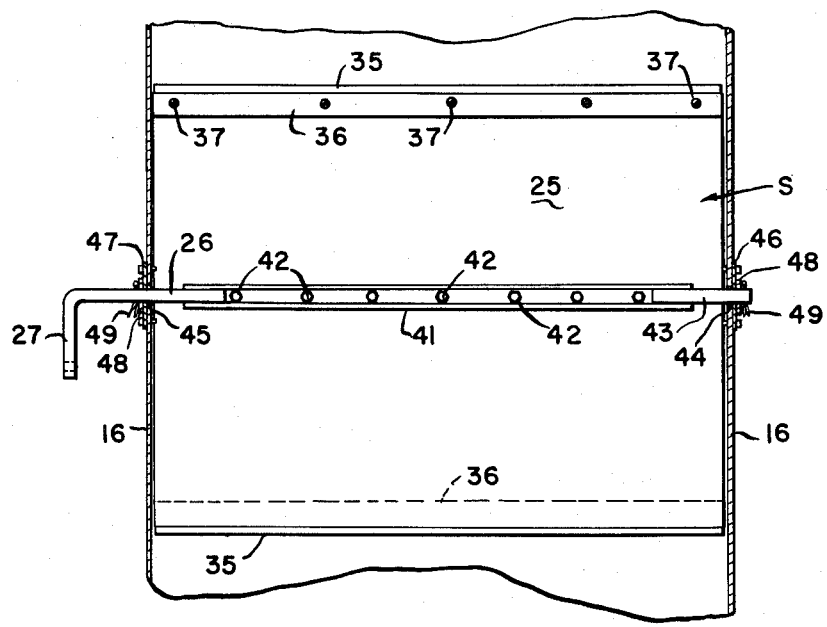

FIG. 4 is an enlarged, fragmentary vertical section, taken along line 4—4 of FIG. 3, showing the connection between a crank and shutter arm in full lines with the shutter in closed position and in dotted lines with the shutter in open position; and FIG. 5 is an enlarged, fragmentary vertical section taken along line 5—5 of FIG. 2, showing details of the shutter construction with the shutter in open position.

The present invention provides a shutter within the radiator shield, between the screen and the radiator of the engine, but the shutter is pivoted in such a manner that it may be closed very quickly and is swung through a very small arc, such as 45°. This type of mounting of the shutter provides a new and unobvious result not obtained by previous devices. One theory of operation is based on the fact that the fan pulls a large mass of air, moving through the radiator shield and screen. Therefore, if the shutter can be closed quickly enough, the mass of moving air will strike the shutter, creating a shock wave or air hammer in the opposite direction, which will knock the chaff from the screen. The principle is similar to that which creates water hammer in a water pipe when a valve is quickly closed. The result is somewhat like a small explosion within the shield, the chaff being blown a considerable distance from the screen. Another theory of operation is that, due to the elasticity of the large mass of air being moved and its velocity, if the shutter is closed quickly enough, the air still rushing into the shield is compressed, raising the pressure in the shield above atmospheric pressure. Such compression would take place for only a very short period of time, after which the air then quickly expands, to blow the chaff from the shield in reducing the pressure within the shield to that of the surrounding atmosphere. Thus, it is possible that the chaff is blown from the screen by a combination of both air hammer and built up air pressure. In any event, the desired result can only be accomplished by an extremely quick closing of the shutter within the radiator shield. Thus, with the cleaner of this invention, it is possible for the operator of a combine to clean the radiator shield, without leaving his seat, by means of a remote control mechanism to operate the shutter and without interruption of the harvesting operation. In fact, the cleaner of this invention operates best when the motor of the combine is running at high speed, thereby causing a maximum flow of air through the radiator shield, apparently to create a greater air hammer or air pressure for cleaning the screen. Thus, it has been possible to clean a badly clogged screen in less than five seconds, with the cleaner of this invention, without stopping the combine.

The cleaner of this invention is illustrated as being mounted on one form of combine, but it will be understood that the invention may be adapted for use on other types of combines and on other agricultural machinery using radiator shields and screens, such as cotton pickers and the like. Thus, as in FIG. 1, the cleaner of this invention is installed on a combine having a grain hopper H located directly behind the operator's seat 10 at one side of the combine, the hopper H having front and rear walls 11 and 12, the latter being shown in FIG. 3, and side walls 13 which taper downwardly and inwardly to form a collecting trough for removal of grain. It will be understood that the combine is provided with a conventional conveying and elevating mechanism by which grain threshed by the combine can be delivered directly into a truck which moves along with the combine, or alternatively into the hopper when a truck is not in position to receive the grain, as well as from the hopper into the next truck when it pulls into position. An internal combustion motor M, for driving the combine, is mounted transversely of the combine, at the rear of hopper H. The motor M is provided with a radiator 14, as in FIGS. 1 and 2, and a fan 15, as in FIG. 2, which pulls air through the radiator and also through an upright shield, conveniently attached to the radiator, so that air pulled through the radiator will be drawn from an elevated position which reduces the amount of chaff tending to be drawn into the shield but does not eliminate it. The shield includes a lower rectangular housing 16 having an opening 17, as in FIG. 2, which permits the fan to pull the air from the shield through the radiator, thus cooling the engine. The upper end of the shield is provided with a screen 18 extending over the rounded top and downwardly along each side, and also front and rear screens 19, conveniently mounted on a box shaped frame 20 having a correspondingly rounded top and connected to housing 16 by hinges 21, so that the frame and screens may be swung downwardly and outwardly to the position of FIG. 3 for inspection or other purposes. As will be evident, chaff accumulates on screens 18 and 19, causing excessive heating of the motor, necessitating the operator to remove the chaff from the screen as it accumulates so that the motor will not become overheated.

In accordance with the present invention, a shutter S, which includes a rectangular plate 25, is installed in housing 16, for pivotal movement through a relatively small arc of travel, such as 45°, between the normally open position shown in dotted lines in FIG. 2 and the closed position shown in full lines in FIGS. 2 and 3. In the open position, shutter S permits air to flow through the shield and radiator, while in the closed position, the shutter closes off the flow of air. The shutter plate 25 is mounted on a rod 26 which extends through the front of housing 16 and may be swung quickly by means of an arm 27 at its outer end. Arm 27, as in FIG. 1, is connected by links 28 to a crank 29, which is operated by a handle 30, which is conveniently located near the seat 10 of the operator of the combine. The shutter is held in its normally open position by a light spring 31, one end of which is attached to one of links 28, as in FIG. 4, and the opposite end of which is attached to a bracket 32 mounted on rear wall 12 of hopper H, as in FIG. 3. As will be evident from FIG. 4, when crank 29 is turned to cause arm 27 to turn through 45°, against the pressure of spring 31, the shutter will be moved from the open position to the closed position, the dotted position of arm 27, links 28 and crank 29 shown in FIG. 4 corresponding to the open position of the shutter and the full position thereof corresponding to the closed position of the shutter. Crank 29 may be longer than arm 27, as in FIG. 4, so that crank 29 and handle 30 need be moved through a shorter arc than arm 27 to move the shutter from open to closed position. Arm 27 and crank 29 may be pivotally connected to links 28 by bolts 33, as in FIG. 4. Preferably, the edges of the shutter plate 25 are provided with resilient sealing strips 35, as of rubber, attached by metal strips 36 and screws 37, as in FIGS. 2 and 5, so that an air seal will be formed at each longitudinal edge of plate 25 when the shutter closes, to enhance the closure of housing 16 to the passage of air.

As the air is pulled through the radiator and through the screens 18 and 19 by the fan, the blown chaff from the combine will accumulate on the screens. In order for the operator to clean off the screens, it is necessary only for him quickly to turn handle 30 in a clockwise direction, as viewed in FIG. 1, which causes the shutter S to be swung quickly to the closed position, thereby creating an air hammer or a back pressure, or both, within the radiator shield, which knocks or blows the chaff off the screen and out from between the wires. As indicated previously, it is not entirely clear upon which of the above theories the device operates, and may be a combination of both. Thus, an air hammer can occur similarly to water hammer in a water pipe when a valve is suddenly closed, i.e., when the shutter S is quickly closed, the sudden impact on the shutter of the mass of air rushing in creates a shock wave traveling in the opposite direction, which rebounds onto the screens 18 and 19, knocking the chaff from them. Also, it may be that, due to the volume of air being pulled through the shield and due to the elasticity of the air, upon rapid closing of the shutter, the still inrushing air is compressed against the shutter and then expands, blowing the chaff from the screen. In any event, the reaction takes place immediately upon closing of the shutter and has the indications of a small explosion within the shield.

After closing the shutter, the operator merely moves handle 30 to its original position to move the shutter to open position, assisted by spring 31 and air suction. To assure that the shutter does not move past vertical position, a stop 40 is mounted inside one end of housing 16, conveniently just above rod 26, as in FIG. 2. Under ordinary conditions, one closing of shutter S will completely clean screens 18 and 19. However, under extreme conditions, such as when the grain is being cut very close to the ground and the combine is being operated in an area where cottonwood trees, Canadian thistle and the like are prevalent, the screen may become so clogged that only a small amount of air is passing through the screen and only a very small air hammer or back pressure within the screen will be created, so that only a portion of the chaff is blown away. However, some of the chaff will be cleaned off, so that the amount of air passing through the shield and radiator is increased. It is necessary then for the operator only to operate handle 30 one or more additional times. The air hammer or air pressure created within the shield on the second or third operation is generally great enough to blow the rest of the chaff away. Under the worst conditions found, the cleaner was able to clean all of the chaff from the screen with three closings of shutter 21. Since opening and closing of the shutter may be produced in rapid succession, it has normally required no more than about five seconds to completely clean the screen under extremely adverse conditions.

The shutter plate 25, as in FIG. 5, is conveniently attached to a longitudinally extending channel 41, as by means of spaced bolts 42, the channel 41 being disposed at the axis of pivotal movement of the shutter and receiving rod 26 at one end and a hinge pin 43 at the other end, with rod 26 and pin 43 being attached to the channel, as by welding. Channel 41 is attached to shutter plate 25 above the center of the shutter plate, thereby causing the shutter to be heavier and have a greater area at the bottom than at the top, not only to assist spring 31 in maintaining the shutter in a vertical open position, but also to cause the differential in suction from fan 15, when handle 30 is moved back, to assist in pulling the shutter to open position. Hinge pin 43 extends through a hole 44 in the rear of housing 16 and rod 26 extends through an aligned hole 45 in the front of housing 16, for engagement with bearing collars 46 and 47, respectively, mounted on the outside of the housing and secured thereto, as by means of bolts, as shown. Hinge pin 43 and rod 26 may be restrained against axial movement in any siutable manner, as by washers 48, disposed outside collars 46 and 47, and cotter pins 49 placed in appropriate holes in the hinge pin and shutter arm. To install the shutter, the shutter plate 25 is disconnected from channel 41, prior to the installation of collars 46 and 47, washers 48 and cotter pins 49. With frame 20 in the open position of FIG. 3, arm 27 and a portion of rod 26 are inserted through hole 45 and moved to the left, as viewed in FIG. 5, until the end of channel 41 abuts the wall of the housing, after which hinge pin 43 may be inserted through hole 44 and the assembly moved to a central position. Then, collars 46 and 47 may be installed and washers 48 and cotter pins 49 placed in position, to hold channel 41 in a central position during attachment of plate 25 to the channel.

The connection between handle 30 and crank 29 may be installed in a somewhat similar manner. Thus, crank 29 is formed at the end of a rod 50 and is inserted from the inside of hopper H through a hole in rear wall 12 of the hopper H, with a washer 51 of FIG. 3 slidable thereon. At its inner end, rod 50 is provided with a hole through which a bolt 52 of FIG. 1 may be inserted, when the inner end of rod 50 is placed in a socket 53, provided at the inner end of a rod 54, on the outer end of which handle 30 is formed. Handle 30 and a portion of rod 54 are inserted, from the inside, through an aligned hole in the front wall 11 of hopper H, prior to connection of rods 50 and 54, with a washer similar to washer 51 slidable thereon. After bolt 52 has been placed, washer 51 is moved against the inside of rear hopper wall 12 and a cotter pin 55 placed in a hole in rod 50 provided for that purpose, while the similar washer on rod 54 may be moved against the inside of front hopper wall 11 and a cotter pin similarly installed, to restrain rods 50 and 54 against axial movement. Then, links 28 may be attached to arm 27 and crank 29, and a hand grip 56 installed on handle 30 for convenience of the operator. It will be understood, of course, that handle 30 may be connected with crank 29 in other ways and that other connections between the handle and shutter may be utilized.

From the foregoing, it will be evident that a cleaner constructed in accordance with this invention fulfills to a marked degree the requirements and objects hereinbefore set forth. It is readily apparent that the cleaner of this invention is of simple construction, requiring a minimum number of parts, and it is equally apparent that the cleaner may be easily and quickly installed. The cleaner is highly efficient, quickly removing all of the chaff or other material which collects on the screen or screens, as within a matter of five seconds or less. In looking for conditions in which the cleaner of this invention will not clean a radiator shield of a combine, over substantially the entire western half of the United States, no such conditions have been found. The cleaner of this invention is much more efficient than any previous cleaner known, because the shutter swings quickly through a very small angle, causing air pressure to be built up within the radiator shield which expands through the screen to the atmospheric air outside, thus blowing the chaff from the screen or causing an air hammer or shock wave to be created which knocks the chaff from the screen. In prior cleaners, the shutter swings through too great an angle and closes too slowly to cause any chaff to be blown away. In the case of such cleaners, it is necessary for the operator of the combine to stop the combine, climb down off his seat, then go back and scrape the chaff from the screen. With the cleaner of the present invention, the screen may be cleaned as the combining operation continues, that is, the operator does not need to leave his seat, nor need he stop the combine, as indicated previously. The cleaner of this invention works best, in fact, when the motor is running wide open, allowing the fan to pull a maximum amount of air through the screen prior to closing the shutter.

Although a preferred embodiment of this invention has been illustrated and described, it will be understood that other embodiments may exist and various changes and variations made, without departing from the spirit and scope of this invention.

What is claimed is:

1. A screen cleaning device for agricultural machinery and the like having an internal combustion engine, a radiator for said engine, a fan for moving air through said radiator, a housing having a lower side opening through which air passes to said radiator and at least one upper air intake opening across which a screen extends, the improvement comprising a shutter pivotally mounted intermediate its edges within said housing intermediate the upper and lower edges of said lower side opening and movable between an open position in which one side of the shutter directs a portion of the air to the top of said radiator and the other side directs another portion of said air to the bottom of said radiator, and a closed position in which said shutter engages the inside of said housing at the side having said lower opening but above said lower opening and extends anguuarly across the inside of said housing into engagement with the opposite side thereof, said shutter in closed position closing the inside of said housing and blocking the flow of air through said housing and said shutter being movable through an acute angle between open and closed positions; and means for moving said shutter between said open and closed positions.

2. In a screen cleaning device for agricultural machinery and the like, having an internal combustion engine, a radiator for said engine, a fan for moving air through said radiator, a housing having a lower side opening through which air passes to said radiator and at least one upper air intake opening across which the screen extends, the improvement comprising a shutter pivotally mounted intermediate its edges within said housing and intermediate the upper and lower edges of said side opening and quickly movable through an acute angle from an open position in which the flow of air through said housing is substantially unimpeded to a closed position in which said shutter engages the inside of said housing at the side having said lower opening but above said lower opening and extends angularly across the inside of said housing into engagement with the opposite side thereof so that the reaction of the air striking the closed shutter will cause any foreign material which collects on said screen to be blown outwardly therefrom; and means for rapidly moving said shutter between said open and closed positions.

3. A device as set forth in claim 2, wherein said shutter is pivotal about a horizontal axis adjacent the center of said shutter but spaced above the center of gravity thereof.

4. A device as set forth in claim 3, wherein said housing is upright and is rectangular in cross section; and said shutter includes a rectangular plate having a width corresponding to one dimension of the inside of said housing and length sufficiently greater than the other dimension of the inside of said housing that one edge of said shutter will engage the inside of said housing above said lower opening and the opposite edge of said shutter will engage the inside of said housing opposite said opening, with said plate disposed at an angle of approximately 45 degrees to the vertical in closed position, said shutter being vertical in the open position thereof.

5. A device as set forth in claim 2, in which said shutter is provided with flexible sealing strips at opposite edges thereof and adapted to abut the inside of said housing to form a tight seal between said shutter and said housing when said shutter is pivoted to closed position.

6. A device as set forth in claim 2, in which said means for moving said shutter includes a handle mounted adjacent the seat of the operator of said machinery; and remote control means interconnecting said handle and said shutter.

7. A device as set forth in claim 2, including spring means connected to said pivot means for biasing said shutter toward a vertical open position; and stop means for preventing said spring means from pivoting said shutter past said vertical position.

8. A device as set forth in claim 7, wherein said stop means is attached to the inside of said housing for engagement with said shutter.

9. A device as set forth in claim 2, said housing being upright and said machinery being provided with a hopper disposed forwardly of said engine and housing and an operator's seat forwardly of said housing, said hopper having front and rear walls, wherein said means for moving said shutter between open and closed positions includes a first pivotal rod extending through the front wall of said hopper and having a handle on the front end thereof adjacent said seat; a second pivotal rod extending through the rear wall of said hopper and having a crank on the rear end thereof; means for connecting the rear end of said first rod to the front end of said second rod, one of said rods having a socket into which the end of the other of said rods extends; a pivot rod for said shutter extending through said housing and provided with an angularly extending arm shorter than said crank; at least one link pivotally connecting the outer end of said crank and the outer end of said arm; a spring having one end attached to said link and the other end attached to the rear wall of said housing; and removable means for restraining axial movement of said first rod and said second rod.

10. A device as set forth in claim 2, said housing being upright, rectangular in cross section and having aligned apertures in the sides thereof, wherein said shutter is vertical in open position and includes a rectangular plate having a width corresponding to the width of said housing and a length such that the upper edge of said shutter will engage the inside of said housing above said lower opening and the lower edge of said shutter will engage the inside of said housing opposite said opening, when said shutter is moved through an arc of approximately 45 degrees; a flexible, resilient strip extending along and attached to each of the upper and lower edges of said plate for engagement with the inside of said housing; a transverse channel removably attached to said plate at a position spaced above the center thereof; a pivot pin fixedly attached to one end of said channel and extending through one of said apertures in said housing; a pivot rod fixedly attached to the opposite end of said channel and extending through the opposite aperture in said housing, said pivot rod having an angular arm on the outer end thereof for connection to said shutter moving means; removable means for restraining axial movement of each of said pivot pin and said pivot rod; and bearing collars for said pivot pin and said pivot rod attached to the outside of said housing, each said bearing collar having a hole therein smaller than the corresponding aperture.

References Cited in the file of this patent

UNITED STATES PATENTS

| | | |
|---|---|---|
| 2,376,546 | Lundberg | May 22, 1945 |
| 2,455,734 | Clausen | Dec. 7, 1948 |

FOREIGN PATENTS

| | | |
|---|---|---|
| 508,252 | France | July 19, 1920 |
| 556,619 | Germany | Aug. 16, 1932 |